United States Patent [19]

Deli et al.

[11] Patent Number: 4,844,195

[45] Date of Patent: Jul. 4, 1989

[54] RESILIENT MOUNTING OF CRAWLER TRACTOR FRAME

[75] Inventors: Jack M. Deli, Winfield; Al J. Nagorzanski, Arlington Heights; Harvey B. Karpiel, Bloomingdale; Marino J. Pisani, North Riverside, all of Ill.

[73] Assignee: Komatsu Dresser Company, Libertyville, Ill.

[21] Appl. No.: 208,574

[22] Filed: Jun. 17, 1988

[51] Int. Cl.[4] ............................................. B62D 55/00
[52] U.S. Cl. ..................................... 180/9.5; 180/9.54; 280/716
[58] Field of Search ................. 180/9.5, 9.54; 280/716

[56] References Cited

U.S. PATENT DOCUMENTS

| T982,002 | 5/1979 | Miers | 180/9.6 |
|---|---|---|---|
| 2,537,745 | 1/1951 | Daniels | 305/8 |
| 2,604,176 | 7/1952 | Lindeman | 180/9.54 |
| 2,951,710 | 9/1960 | Willetts | 280/684 |
| 3,010,530 | 11/1961 | Risk | 180/9.54 |
| 3,096,840 | 5/1960 | Mazzarins | 180/9.5 |
| 3,175,840 | 3/1965 | Webster | 280/680 |
| 3,706,481 | 12/1972 | Kramer | 305/27 |
| 3,724,587 | 4/1973 | Kasin et al. | 180/9.54 |
| 3,826,325 | 7/1974 | Purcell et al. | 180/9.54 |
| 3,923,111 | 12/1975 | Purcell et al. | 180/9.54 |
| 4,141,423 | 2/1979 | Cline et al. | 180/9.6 |
| 4,641,855 | 2/1987 | Izumi | 280/716 |
| 4,690,231 | 9/1987 | Riml | 180/9.5 |

FOREIGN PATENT DOCUMENTS 2124563A 2/1984 United Kingdom .
2155415A 9/1985 United Kingdom .

Primary Examiner—Kenneth R. Rice

[57] ABSTRACT

An improved suspension is provided for a track vehicle between a track frame (24,26) and pivot shafts (40,42) on the tractor. The suspension includes an inboard elastomeric assembly (82) and an outboard elastomeric assembly (84) which incorporates an elastomer (100). The elastomer is designed to provide different spring rates in the vertical direction than the horizontal direction parallel the length of the tractor. This permits the vertical spring rate to be set for most effective isolation of the sprung weight (14) of the crawler tractor while the horizontal spring rate is determined by the significant loads induced by an implement, such as a bulldozer blade (12) on the tractor.

13 Claims, 3 Drawing Sheets

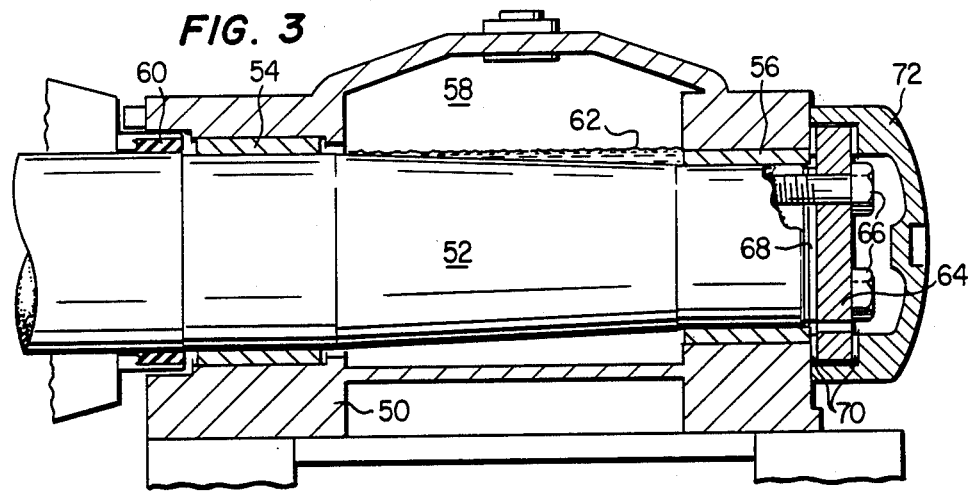
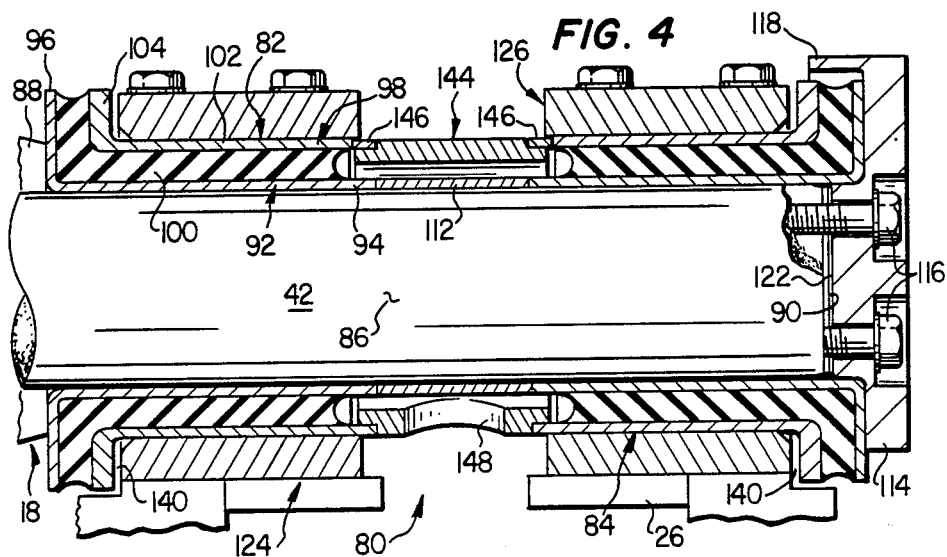
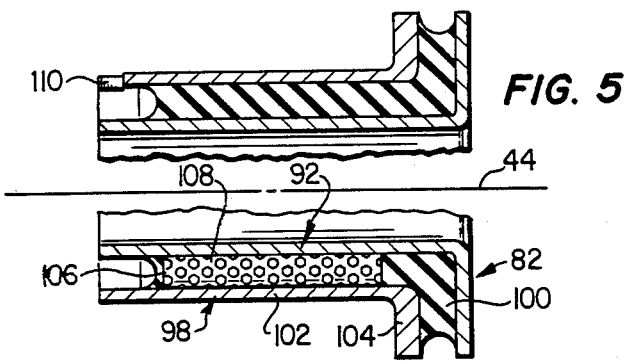

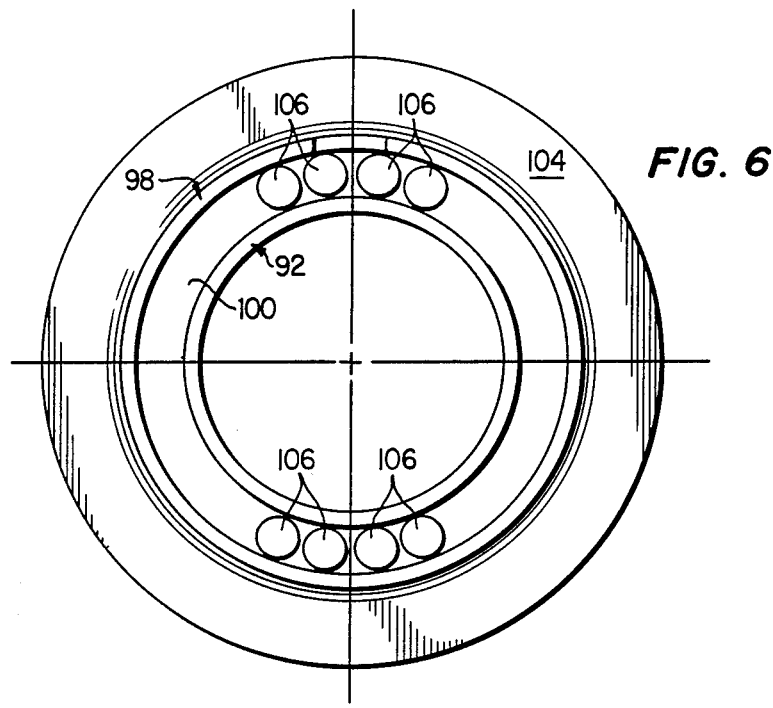
FIG. 6
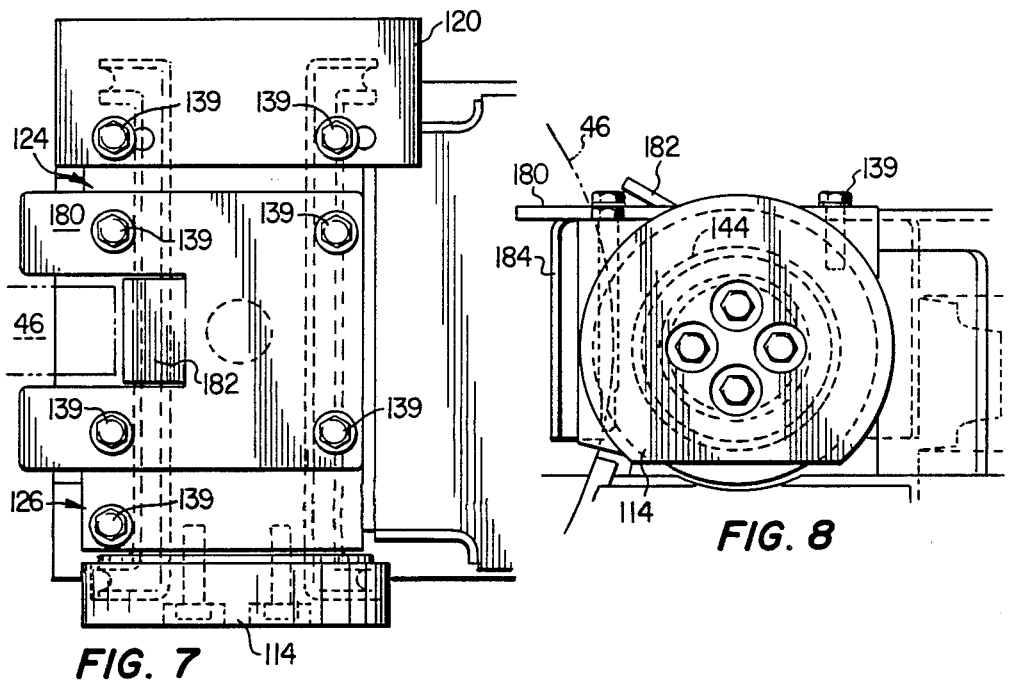
FIG. 7
FIG. 8

RESILIENT MOUNTING OF CRAWLER TRACTOR FRAME

TECHNICAL FIELD

This invention relates to a crawler tractor, and in particular to an improved suspension system for supporting the sprung weight of the machine on the unsprung supporting structure.

BACKGROUND OF THE INVENTION

The crawler tractor has countless applications throughout the world in construction and related industries. It is often used as a bulldozer with the attachment of a bulldozer blade, or with a rear mounted ripper for trenching and the like.

Virtually all crawler tractor designs provide for some suspension or spring action and include portions which are included in the sprung weight of the machine, with other portions included in the unsprung weight. The sprung weight of the machine usually includes the tractor chassis, engine, power train, radiator and the blade mounting equipment. The unsprung weight usually includes the crawler tracks, the track frames, track rollers, front idlers and top idlers.

The sprung weight of the typical machine is supported at three points. An equalizer bar, which functions essentially as a single leaf spring, is pivoted at its center to the sprung weight of the machine and is supported at its ends to the left and right track frames, respectively, and forms the first point. The second and third points of support are the left and right track frame pivot shafts at the rear of the machine about which the track frames have limited pivotal motion.

The spring action of the equalizer bar to some extent isolates the front of the tractor from vibration and shock loads in the unsprung weight. However, traditionally the pivot shafts have been mounted through solid metal to metal contact with the track frames, providing an uninterrupted path for shock and vibration transfer to the machine operator and the tractor machinery.

Several attempts have been made in the past to improve upon the conventional crawler tractor suspension. For example, defensive publication T No. 982,002, published May 1, 1979, discloses a pivot shaft bushing including an elastomeric sleeve. U.S. Pat. No. 3,096,840, issued July 9, 1963, discloses a tractor suspension which employs an annular mass of resilient cushioning material in the suspension. U.K. Patent Reference No. 2,155,415A discloses a crawler vehicle which uses pad cushion rubbers. U.S. Pat. No. 3,826,325, issued July 30, 1974 discloses a track suspension assembly having stops formed of resilient rubber pads such as pads 100 and 102 to cushion movement of crank members 22 and 38. U.K. Patent Reference No. 2,124,563A discloses a sprocket wheel assembly of endless track-type vehicles. It incorporates elastic annular blocks 42 and 43 to mount outer tube 41 on the inner tubes 27 and 35 of a sprocket assembly to absorb shock. However, none of these designs have proven practical in the severe environments in which these crawler tractors must be employed. A need therefore exists for a practical suspension system which reduces the transfer of vibration and stress to the unsprung weight of the machine.

SUMMARY OF THE INVENTION

In accordance with one aspect of the present invention, a suspension is provided for a track vehicle having a pivot shaft and a track frame. The suspension includes an elastomeric assembly which has a rigid inner shell and a rigid outer shell concentric thereto. An elastomer is secured between the shells. Structure is provided for mounting one of the rigid shells to the pivot shaft while the other rigid shell is mounted to the track frame. The elastomeric assembly has a first predetermined spring rate in a first direction and a second predetermined spring rate in a second direction perpendicular to the first direction. The elastomeric assembly is oriented relative to the pivot shaft and track frame with the first direction vertical and the second direction horizontal. This permits the first predetermined spring rate to be set to optimize the suspension characteristics of the vehicle, while the second predetermined spring rate is determined by the operational characteristics of the vehicle as when using a bulldozer blade, ripper or the like.

In accordance with another aspect of the present invention, the shell mounted on the pivotal shaft is secured relative to the axis of the pivot shaft. The elastomeric assembly has a third predetermined spring rate in a third direction parallel the axis of the pivot shaft.

In accordance with another aspect of the present invention, structure is provided to limit the deflection of the pivot shaft relative to the track frame. Further, a pair of elastomeric assemblies can be mounted between the pivot shaft and track frame with a predetermined separation.

BRIEF DESCRIPTION OF THE DRAWINGS

For a more complete understanding of the present invention and the advantages thereof, reference is now made to the following description taken in conjunction with the accompanying drawings, in which:

FIG. 3 is a cross sectional view of a prior art suspension with metal-to-metal contact;

FIG. 4 is a cross sectional view of a first embodiment of the present invention;

FIG. 5 is a side cross sectional view of the elastomeric assembly used in the suspension of FIG. 4;

FIG. 6 is an end view of the elastomeric assembly of FIG. 5;

FIG. 7 is a top view of the suspension;

FIG. 8 is an end view of the suspension; and

DETAILED DESCRIPTION

Figure 1:
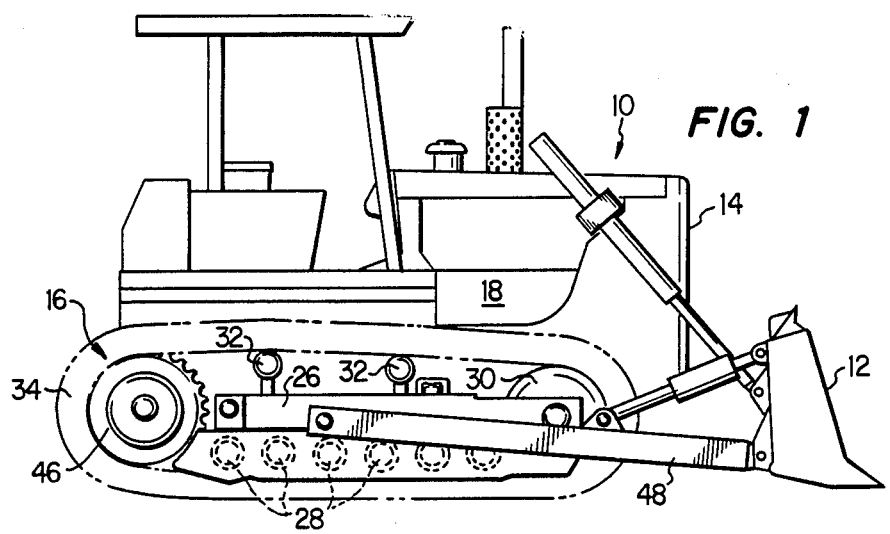
FIG. 1 is a side view of a crawler tractor of the type incorporating the present invention.
Figure 2:
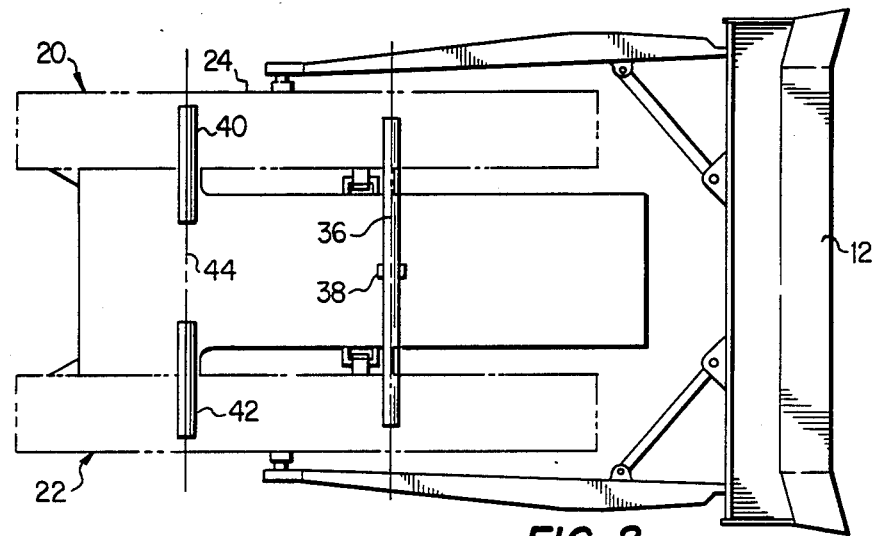
FIG. 2 is a top view of the crawler tractor.

With reference to FIGS. 1 and 2, a typical crawler tractor 10 is illustrated. The tractor provides a mobile, yet stable platform from which ground engaging tools are connected. Generally, these ground engaging tools consist of a bulldozer blade 12 in front of the tractor or a ripper (not shown) mounted on the rear of the tractor for ploughing earth.

The tractor can be viewed to comprise two major components, the sprung weight 14 and the unsprung weight 16. The sprung weight of the tractor includes the tractor chassis, engine, power train, radiator and blade mounting equipment. The chassis, in turn, includes a main frame 18 and the superstructure supporting the operator cab and the like. The unsprung weight includes the left track assembly 20 and the right track assembly 22 and their components, including the left track frame 24, right track frame 26, track rollers 28, front idlers 30, top idlers 32, and the tracks 34.

The sprung weight is supported on the unsprung weight at three points. The first point is the center of an equalizer bar 36 which extends the width of the tractor. The equalizer bar forms essentially a single leaf spring mounted to the sprung weight at its center at a center pivot mount 38, and at its ends to the left and right track frames. The use of the equalizer bar provides some isolation between vibration and shock loading between the unsprung weight and the sprung weight.

The other two mounting points are formed by a left pivot shaft 40 and a right pivot shaft 42 which are rigidly mounted to the sprung weight and extend outwardly from either side of the tractor near the rear of the tractor to engage the tractor frames, permitting pivotal motion of the track frames about the common axis 44 of the shafts. As will be explained in greater detail hereinafter with reference to FIG. 3, the conventional crawler tractor provides a metal-to-metal pivotal mounting between the pivot shafts and the track frames, providing a direct path for vibration and loading effects on the unsprung weight to be transferred to the sprung weight.

The drive sprockets 46, forming part of the drive train of the tractor, do not provide support for the sprung weight, but, rather are part of the sprung weight, since the tracks 34 rise slightly from the last track rollers 28 to the drive sprockets. In actuality, the track rollers 28 provide the vast majority of support for the track frames, and thus for the sprung weight. The front idlers 30 provide marginal support.

In such a design, four major forces act on the pivot shafts. First, vertical vibration and shock loads from the ground. Secondly, the dozer blade 12 is mounted on the tractor through dozer push arms 48 pivotally mounted to each track frame. When the blade 12 engages the ground as the tractor is moving forward, a horizontal reaction force is created through the push arms 48 to support the blade. A third force is caused by the tension in the tracks 34 themselves. This force is particularly severe when the tractor is moving in reverse and when mud or snow is packed between the sprockets and track. Lastly, lateral forces can be applied to the track frames generally parallel axis 44 when the tractor is being turned, or when the tractor is working on a sloped surface. This force can become an impact load should the tractor slide on the slope and hit a stationery object, such as a stump or rock.

With reference now to FIG. 3, a prior art suspension for mounting a track frame 50 on a pivot shaft 52 is illustrated. The track frame 50 is bored to accept an inner bushing 54 and an outer bushing 56 made of bronze or a fibrous phenolic material. The pivot shaft 52 is tapered and extends through the bushings to provide support for the track frame. The use of such bushings requires the pivot shaft to be selectively induction hardened to prevent excessive wear of the shaft or frequent expensive shaft replacement. Induction hardening is an expensive procedure requiring the straightening of the shaft, which occasionally results in cracking. This cracking problem not only wastes resources in having to replace the cracked shaft, but requires labor intensive inspections for such cracks before final approval of the shaft for shipment to a customer.

With such a bushing mount, lubrication is required. Therefore, the bushings, and compartment 58 therebetween, must be isolated from the exterior environment by seals 60 to permit oil 62 to lubricate the bushings. Seals 60 typically contain no rubbing element, but rather are a rubber element that goes into torsion when the track frame oscillates about the pivot shaft. The seals are quite expensive and difficult to install, and are usually destroyed when the suspension is disassembled.

Axial retention of the track frame 50 on the pivot shaft 52 is accomplished by a thrust plate 64 secured to the end of the shaft by bolts 66. Shims 68 are used between the end of the pivot shaft and the thrust plate to axially position the track frames to optimize the lateral alignment between the track rollers and the drive sprocket. Two thrust washers 70 cooperate with a retainer 72 to prevent galling of adjacent parts.

In addition to the complications and expense inherent in such a design, it can be seen that there is essentially a solid connection between the track frame and the pivot shaft, which provides a direct path for load and vibration induced forces in the track frame to travel into the sprung weight 14 and affect the operator and the machinery, such as the engine and drive train. Such forces create significant operator fatigue and require the components of the sprung weight to be designed to tolerate such force transmission.

With reference now to FIGS. 4–9, a suspension 80 forming a first embodiment of the present invention is illustrated. As illustrated in FIG. 4A, the suspension 80 pivotally supports the track frame 26 on the pivot shaft 42 while providing a cushioning or spring suspension as illustrated by horizontal spring rate 190, vertical spring rate 192, and axial spring rate 194. Each of the spring rates 190, 192 and 194 is selected to optimize the suspension action in that direction. For example, spring rate 190 is selected to resist forces generated by use of the bulldozer blade 12, ripper, or other tool, and thus must be relatively stiff. The vertical spring rate 192 is selected to support the weight of the vehicle and provide greater resiliency and spring to the suspension for operator comfort and to minimize equipment vibration. The axial spring rate 194 can be set at yet a third value to resist axial movement between the tractor and frames. In one suspension designed in accordance with the teachings of the present invention, the horizontal spring rate 190 is about 182,000 lbs per inch to resist a maximize static load of 42,000 lbs. The vertical spring rate 192 is 33,000 lbs. per inch for a static load of 5,000 lbs. The axial spring rate 194 is 250,000 lbs. per inch to permit only limited axial flexure between the track frames and sprung weight. The spring rates may vary depending on induced loads and desired damping effect.

With specific reference to FIG. 4, the suspension includes an inboard elastomeric assembly 82 and an outboard elastomeric assembly 84 which act to pivotally support the track frame 26 on the pivot shaft 42 while providing a cushioning or spring suspension to prevent the transfer of excessive vibration or loads from the track frame to the sprung weight.

In contrast to prior shafts, such as shaft 52, the pivot shaft 42 has an outer surface 86 of uniform diameter. The inner end of the shaft 42 is mounted to the frame 18 of the tractor and extends outwardly past annular shoulder 88 on the frame to end 90.

The inboard elastomeric assembly 82 has an inner shell 92 with a horizontal cylindrical portion 94 and a vertical shoulder portion 96. The inner diameter of portion 94 is sized to permit a slip fit over the shaft 42 until the outside of shoulder portion 96 abuts the shoulder 88 of the main frame.

An outer shell 98 is supported concentrically about the inner shell 92 by elastomer 100 bonded between the shells 92 and 98. The outer shell is also provided with a horizontal cylindrical portion 102 and a vertical shoulder portion 104. The elastomer 100, in its nondeformed configuration, is bonded between the facing surfaces of the shells 92 and 98.

With reference now to FIGS. 5 and 6, the nature of the elastomeric assembly 82 can be better understood. The elastomeric assembly is designed to have a first lower spring rate in the vertical direction when installed in the suspension and a higher, stiffer spring rate in the horizontal direction. This asymmetry is desirable because the horizontal spring rate of the elastomeric assembly must be stiff enough to resist the large horizontal forces generated by use of the bulldozer blade 12, ripper, or other tool. However, it is desirable to have a lesser spring rate in the vertical direction to provide more resiliency or spring to the suspension of the sprung weight on the track frames.

This asymmetry is accomplished by the formation of a series of holes 106 in the top and bottom of the elastomer which extend along axes parallel the axis 44. Preferably, the holes 106 are filled with a compressible material such as closed cell foam rubber 108 to exclude mud or dirt which otherwise might enter the holes and eventually fill the holes to the point where the spring rate is no longer as desired. Clearly, the elastomeric assembly 82 must be oriented about the axis 44 to align the lesser spring rate in a vertical direction and the larger spring rate in the horizontal direction. This can be accomplished by marking the assembly and preferably having a key slot 110 for alignment with the remainder of the suspension, as discussed hereinafter.

The outboard elastomeric assembly 84 is substantially identical in construction and operation to assembly 82. In fact, assemblies 82 and 84 can be identical to reduce inventory requirements. The outboard elastomeric assembly 84 is slid over the end 90 onto the pivot shaft and spaced from the inboard elastomeric assembly by an annular inner spacer 112. The inner shells of the elastomeric assemblies, and inner spacer 112 are then fixed relative to the pivot shaft by an end cap 114 bolted to the end of the shaft by bolts 116. The end cap is provided with a portion that extends inward over the shoulder portions of the assembly 84 to form an elastomer protector 118. A similar protector 120 having vertical portions 184, seen in FIGS. 7 and 8, can be used to protect the shoulder portions of the inboard elastomeric assembly 82. Shims 122 limit the compressive force exerted by the bolts 116 on the inner shells and inner spacer.

Figure 9:
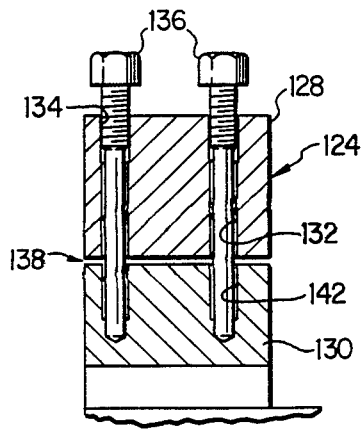
FIG. 9 is an illustrative cross sectional view of the split blocks in the track frame.
Figure 4A:
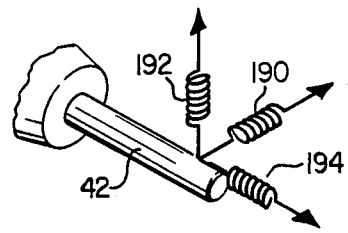
FIG. 4A is a schematic view of the spring rates desired in the suspension of FIG. 4.

The inboard elastomeric assembly 82 is secured to the track frame by an inboard split block assembly 124. The outboard elastomeric assembly 84 is secured to the track frame through an outboard split block assembly 126. As best seen in FIG. 9, each split block assembly includes an upper member 128 and a lower member 130 having facing semi-cylindrical surfaces for frictionally engaging the outer surface of the outer shell of an elastomeric assembly. Aligned threaded apertures 132 are formed in the members. A threaded portion 134 in the aperture in each upper member 128 threadedly engages a jack screw 136 to facilitate installation of the elastomeric assemblies. As the jack screws are tightened, the lower end of the jack screws push against the bottom of the apertures 142 to enlarge the split 138 between the members and permit the elastomeric assemblies to be slid into position between the pivot shaft and members, with a small axial gap 140 between the shoulder of the outer shells and the members 128 and 130, as best seen in FIG. 4. Once the assemblies are positioned for proper alignment of the track rollers to sprocket, the jack screws are removed and bolts 139 threaded into the threaded portions 142 of the apertures in the lower members 130 to clamp the members onto the outer shells of the elastomeric assemblies.

With reference to FIG. 4, an annular outer spacer 144 is preferably installed between the outer shells of each elastomeric assembly which has opposed keys 146 for engaging the slots 110 in each elastomeric assembly for alignment. Also, a large dirt shedding hole 148 is formed in the bottom of the outer spacer to permit dust and contaminants entering the suspension to fall out before they cause significant wear. While the inner sleeves preferably are slip fit over the pivot shaft, an anaerobic compound can be coated on the shells to provide frictional engagement between the shells and pivot shaft.

In addition to maintaining proper positioning of the elastomeric assemblies 82 and 84, the inner spacer 112 and outer spacer 144 also function as deflection limiters. The space between the inner diameter of the outer spacer 144 and the outer diameter of the inner spacer 112 is purposely selected to allow only a predetermined maximum deflection of the elastic assemblies before the spacers' contact to prevent further deflection. Thus, the spacers also act to limit the load exerted on the elastomeric assemblies. As a load is applied to the assemblies 82 and 84, the elastomer therein is deformed and the outer spacer moves toward the inner spacer, closing the gap between the spacers. When the outer spacer contacts the inner spacer, it creates a locking effect that prevents any further compression of the elastomeric material, thereby preventing over stressing of the elastomer. By changing the spacing, which is one half the difference in diametrs between the inner surface of outer spacer 144 and the outer surface of inner spacer 112, the maximum allowable load exerted on the elastomeric assemblies can be increased or decreased.

The main drive sprocket 46 is fit quite closely behind suspension 80, as illustrated in FIGS. 7 and 8. A rock shield 180 is mounted to the suspension through bolts 139 and is fitted as closely as practicable about the sprocket 46 to prevent large stones and rocks from entering the area and being crushed between the sprocket teeth and the outer spacer 144. Without the rock shield, the effect of rocks crushed against the spacer 144 could deform the outer spacer and severely hamper its function as a load and deflection limiter. The rock shield includes an elevated ramp 182 directed toward the sprocket to assist in deflecting rocks thrown down by the sprocket.

In addition, the end cap 114 and protector 120 protect the suspension from damage. In particular, portions 184 of protector 120 extend down the front and back sides of the suspension 80 to protect the elastomer assembly 82.

In one suspension constructed in accordance with the teachings of the present invention, the horizontal stiff spring rate was set to 182,000 pounds per inch to resist a maximum static load of 42,000 pounds. The vertical spring rate was set to 33,000 pounds per inch for a static load of 5,000 pounds. The spring rate of the suspension parallel the axis 44 was 250,000 pounds per inch to permit limited axial flexure the track frames and sprung weight.

Among the advantages presented by the design of the present invention, is the fact that the suspension need have no lubricating oil, eliminating the need for expensive and troublesome oil seals as required in the prior designs. Further, the pivot shaft need not be tapered or stepped, and the induction hardening may be eliminated thus reducing the cost of the component.

Although a single embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the scope and spirit of the invention.

We claim:

1. A suspension for a track vehicle having a pivot shaft and a track frame, comprising:
    an elastomeric assembly having a rigid inner shell, a rigid outer shell concentric to the inner shell, and an elastomer therebetween;
    means for mounting one of said shells to the pivot shaft;
    means for mounting the other of said shells to the track frame; and
    the elastomeric assembly having a first predetermined spring rate in a first direction and a second predetermined spring rate in a second direction perpendicular to the first direction, the elastomeric assembly being oriented relative to the pivot shaft and track frame with the first direction vertical and the second direction horizontal, the first and second spring rates being independently selected.

2. The suspension of claim 1 wherein a sprocket on the track vehicle is mounted proximate the elastomeric assembly, said suspension further comprising a rock shield mounted on said track frame mounting means to protect the elastomeric assembly from debris carried by the sprocket.

3. The suspension of claim 1 further having a second elastomeric assembly and means for mounting one of the shells of said second elastomeric assembly to the pivot shaft a predetermined separation from the first elastomeric assembly and means for mounting the other of said shells on the second elastomeric assembly to the track frame.

4. The suspension of claim 1 further having means to limit the deflection of the pivot shaft relative to the track frame.

5. The suspension of claim 1 wherein the elastomeric assembly has a third predetermined spring rate along a third direction perpendicular the first and second directions and parallel the center axis of the pivot shaft to permit limited movement of the track frame along the axis of the pivot shaft.

6. The suspension of claim 1 further comprising means for covering the elastomer when the elastomeric assembly is mounted on the track vehicle to isolate the elastomer from external contaminants.

7. The suspension of claim 3 further having an inner spacer to separate the inner shells of the first and second elastomeric assemblies and an outer spacer to separate the outer shells of the first and second elastomeric assemblies, the spacing between the inner and outer spacers prior to the exertion of an external force on the track vehicle being selected to limited the deformation of the elastomer in both the first and second directions.

8. The suspension for a track vehicle having a pivot shaft and a track frame, comprising:
    an inboard elastomeric assembly and outboard elastomeric assembly, the pivot shaft having a portion with a uniform outer diameter extending from a radial shoulder on the vehicle to an end of the pivot shaft, each of said elastomeric assemblies having a rigid inner shell with a cylindrical portion, a rigid outer shell having a cylindrical portion, and a elastomer between said inner and outer shells, with the inner diameter of the inner shell of the inboard elastomeric assembly sized to slide over the pivot shaft to move into abutment with the radial shoulder, the inner diameter of the inner shell of the outboard elastomeric assembly sized to fit over the end of the pivot shaft and onto the pivot shaft;
    means for securing the inner shell of the inboard elastomeric assembly against the radial shoulder and for securing the inner shell of the outboard elastomeric assembly on the pivot shaft a predetermined separation outboard from the inner shell of the inboard elastomeric assembly;
    means for securing the outer shells of the inboard and outboard elastomeric assemblies to the track frame; and
    the elastomeric assemblies providing a first predetermined spring rate in the vertical direction and a second predetermined spring rate in the horizontal direction perpendicular the central axis of the pivot shaft.

9. The suspension of claim 8 wherein the pivot shaft supports a portion of the sprung weight of the track vehicle, an implement being mounted on the track vehicle to perform an operation which generates significant horizontal forces generally perpendicular the center axis of the drive shaft, the first predetermined spring rate being selected to provide a suspension for the sprung weight to isolate the sprung weight from vibration and loads exerted on the track frame, the second predetermined spring rate set to accommodate the significant horizontal forces generated by the implement.

10. The suspension of claim 8 further having means for limiting the deflection of the pivot shaft relative to the track frame.

11. The suspension of claim 8 wherein the means for mounting the outer shells to the track frame permit limited movement of the pivot shaft along its center axis relative to the track frame, the elastomeric assemblies providing a third predetermined spring rate to resist such motion.

12. The suspension of claim 8 wherein the track vehicle has a sprocket proximate the suspension, the suspension further having a rock shield covering the inboard and outboard elastomeric assemblies to prevent impact damage from debris carried by the sprocket.

13. The suspension of claim 10 wherein said means for limiting the deflection of the pivot shaft relative to the track frame includes an inner spacer between the inner shells of the inboard and outboard elastomeric assemblies and a normally concentric outer spacer between the outer shells of the inboard and outboard elastomeric assemblies, the space between the inner and outer spacers limiting the movement between the pivot shaft and track frame in the vertical and horizontal directions to limit the forces exerted through the elastomer.

* * * * *